Aug. 28, 1928.

A. G. ANDREWS

DISH DRIER

Filed Sept. 9, 1926

1,682,654

Inventor
Arthur G. Andrews
By Wilson & McCanna
Attys.

Patented Aug. 28, 1928.

1,682,654

UNITED STATES PATENT OFFICE.

ARTHUR G. ANDREWS, OF ROCKFORD, ILLINOIS, ASSIGNOR TO THE WASHBURN COMPANY, OF WORCESTER, MASSACHUSETTS, A CORPORATION OF MASSACHUSETTS.

DISH DRIER.

Application filed September 9, 1926. Serial No. 134,374.

This invention relates to dish driers or drainers especially designed for ordinary household use.

The principal object is to provide a drier of a simpler and less costly form than previous ones and which furthermore has the advantages that it can be used in any pan of a suitable size which the housewife may have available, and permits the use thereof away from the sink where that is desired or where that becomes necessary by reason of the sink being too small or not having a drain board onto which the ordinary type having open ended drain pans were usually placed. The present device furthermore takes up less storage space in a closet than the previous type which included the special drain pans referred to.

The invention is illustrated in the accompanying drawing, wherein—

Figure 1:
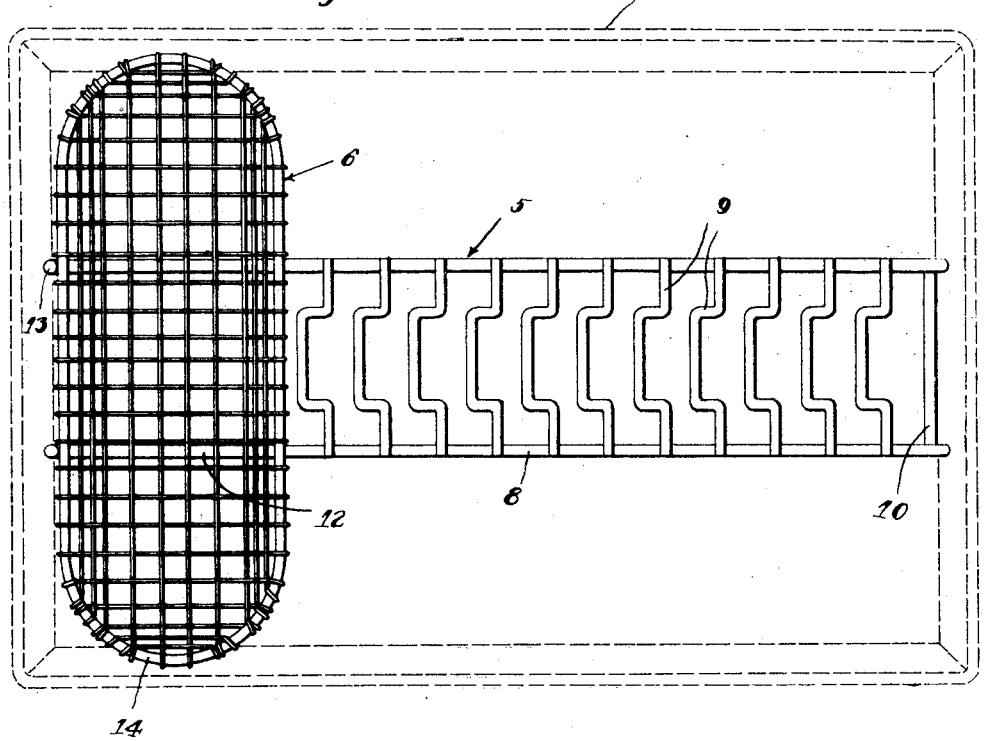
Figure 2:
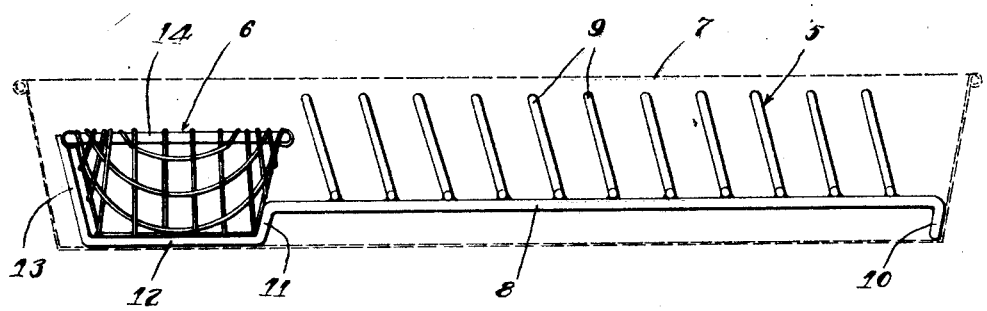

Figure 1 is a plan view of the dish drier of the present invention showing in dotted lines how the same may be placed within a pan to take the water poured over the dishes and silverware; and Fig. 2 is a side view of Fig. 1 with the pan appearing in phantom, this view serving with Fig. 1 to show how the drier is maintained in position in the pan.

The dish drier of the present invention comprises a dish tray or rack 5 and a silverware basket 6 mounted thereon to form a unitary T-shaped device capable of being placed within a pan, indicated in dotted lines at 7. A roaster or other shallow pan conforming to the approximate proportions illustrated is suitable for the purpose. The thought is to enable the placing of the drier within a pan on a nearby table or cabinet where the sink has no drain board on which to place the same. Where a drain board is available, the drier may be placed thereon by itself or inside the pan, as desired. The small size of the drier and the shape thereof also permits placing the same directly in the sink if that is preferred and the size of the sink does not prohibit.

The dish tray 5 comprises a one-piece longitudinal U-shaped wire frame 8 bearing cross wires 9 rising from the frame in inclined relation to permit stacking the dishes against and therebetween to drain. The frame 8 is bent downwardly at one end thereof in the form of a leg 10 to support the frame slightly elevated off the bottom of the pan or other support on which the drier may be placed. This becomes necessary in order that the edges of the plates or saucers stacked in the tray will clear the bottom of the pan and permit proper drainage. The other end of the frame 8 is bent downwardly in a similar manner, as indicated at 11, for a similar purpose. The frame extends beyond the last cross wire to provide an end support for the basket 6. It will be noted that the basket is embraced by the frame 8 on one side at 11, about the bottom at 12, and about the other side by the upturned free ends 13. This construction permits the fastening of the basket 6 by its wire frame 14 and by the smaller wires of the sides and bottom of the basket either by soldering or welding. The same method of fastening is employed in the case of the cross wires 9. The construction is obviously quite sturdy and serviceable.

The positioning of the basket 6 cross-wise with respect to the tray 5 brings the ends thereof close to or in contact with the opposite sides of the pan. The sides of the basket are preferably inclined inwardly so as to conform approximately with the inclination of the side walls of the pan and thus aid in positioning the drier in the pan. The tray 5 comes into engagement with the end of the pan at 10 to complete a three-point contact serving to maintain the drier in position. It is obvious that, with the tray 5 properly centered in the pan, dishes can be stacked therein and space is left on either side to place cups and other pieces that cannot be placed in the tray. The silverware is, of course, received in the basket 6. Hot water is poured over the dishes and silverware to rinse the same and the dishes may then be left to drain and dry by themselves or may be dried in the usual manner.

It is obvious that the invention provides an extremely simple and economical form of drier having a wider range of usefulness than previous types. By reason of the fact that the drier requires no special drain pan as an adjunct thereof but can be used with or without a pan, the initial cost is reduced and a more efficient product results since whatever pan may be used in connection with the drier is capable of other uses about the kitchen. Thus there is avoided the taking up of as much storage space for the one article.

I claim:

1. A device of the character described, comprising a dish tray having a wire frame composed of longitudinal wires and cross wires thereon, said longitudinal wires being bent downwardly at one end of said frame to provide means for supporting said tray in elevated relation to its support, said longitudinal wires being bent downwardly similarly at the other end of said frame for a similar purpose and being bent outwardly to provide an end support beyond said cross wires in the form of an extension of said frame, the free ends of said longitudinal wires being bent upwardly, said wires outwardly of the cross wires being adapted to support a silverware basket.

2. A device of the character described, comprising a narrow, elongated tray and a narrow, elongated basket joined together in cross-wise relation in the form of a unitary T-shaped device arranged to be removably placed within a pan to hold the water poured over the articles in said tray and basket, the outer end of said tray having legs to support the same elevated off the bottom of the pan and serving by engagement with the adjacent end of the pan to provide one point of contact to position the device, the other end of said tray having similar supporting legs provided with extensions whereon said basket is mounted, said basket being arranged by engagement at the opposite ends thereof with the adjacent sides of the pan to provide two other points of contact to position said device therein.

3. A device of the character described, comprising a dish tray having a wire frame composed of longitudinal wires arranged to serve as dish supports, said longitudinal wires being bent downwardly at one end of the frame to provide means for supporting said tray in elevated relation to its support and being bent downwardly similarly at the other end of said frame for a similar purpose and being bent outwardly to provide an end support in the form of an extension of said frame, said wires in said extension being adapted to support a silverware basket.

In witness of the foregoing I affix my signature.

ARTHUR G. ANDREWS.